US009869874B2

(12) United States Patent
Zhang

(10) Patent No.: US 9,869,874 B2
(45) Date of Patent: Jan. 16, 2018

(54) PORTABLE VIRTUAL REALITY GLASSES

(71) Applicant: Shou-Lan Zhang, Taipei (TW)

(72) Inventor: Shou-Lan Zhang, Taipei (TW)

( * ) Notice: Subject to any disclaimer, the term of this patent is extended or adjusted under 35 U.S.C. 154(b) by 112 days.

(21) Appl. No.: 14/805,483

(22) Filed: Jul. 22, 2015

(65) Prior Publication Data

US 2016/0025990 A1    Jan. 28, 2016

(30) Foreign Application Priority Data

Jul. 24, 2014    (TW) .............................. 103213160 U

(51) Int. Cl.
*G02B 27/22*     (2006.01)
*G02B 27/01*     (2006.01)

(52) U.S. Cl.
CPC ..... *G02B 27/2257* (2013.01); *G02B 27/0176* (2013.01); *G02B 2027/0134* (2013.01); *G02B 2027/0178* (2013.01)

(58) Field of Classification Search
CPC ............ G02B 27/2257; G02B 27/0176; G02B 2027/0134; G02B 2027/0178
USPC .................................................. 359/462–477
See application file for complete search history.

(56) References Cited

U.S. PATENT DOCUMENTS

| | | | | |
|---|---|---|---|---|
| 4,846,553 A * | 7/1989 | Rice | ................... | G02B 27/2257 359/408 |
| 5,940,210 A * | 8/1999 | Kassawat | ........... | G02B 27/2257 359/408 |
| 6,069,735 A * | 5/2000 | Murphy | ............. | G02B 27/2257 359/408 |
| 6,456,433 B1 * | 9/2002 | Jones | ................. | G02B 27/2257 359/466 |
| D701,206 S * | 3/2014 | Luckey | ........................ | D14/372 |
| 9,524,580 B2 * | 12/2016 | Katz | .................... | G02B 27/017 |
| 2005/0243418 A1 * | 11/2005 | La | .......................... | G03B 35/18 359/477 |

* cited by examiner

*Primary Examiner* — Bumsuk Won
*Assistant Examiner* — Collin X Beatty
(74) *Attorney, Agent, or Firm* — Mark M. Friedman

(57) ABSTRACT

A portable virtual reality glasses for accommodating an electronic device is provided. The portable virtual reality glasses includes a frame and a spectacle frame assembly assembled with optical lens. The frame includes a first cover, a second cover, a first side plate body, and a second side plate body. The first cover, the second cover, the first side plate body, and the second side plate body are connected with each other to define an accommodation space. By relatively moving the first side plate body and the second side plate body with respect to the first cover and the second cover, the frame can be transformed to either an extended state or a folded state, to change a volume of the accommodation space. The spectacle frame assembly is connected with the frame, for moving relative to the accommodation space of the frame.

25 Claims, 11 Drawing Sheets

PORTABLE VIRTUAL REALITY GLASSES

FIELD OF THE INVENTION

The present invention relates to a virtual reality glasses, and more particularly to a portable virtual reality glasses.

BACKGROUND OF THE INVENTION

With the development of technology, a virtual reality or 3D technology has been gradually applied to the fields of videos, movies, medicine, simulated training, and games. A three-dimensional virtual reality world can be created by using three-dimensional images and posture sensors together with computer equipment.

In virtual reality technology, the virtual reality world can be created by using a computer or an electronic device, and a user can get a variety of sensory simulation from the computer or the electronic device by using special media, so as to achieve an effect of entering the virtual reality world. The above-mentioned media comprise a virtual reality glasses for providing visual information or a virtual reality gloves for providing tactile information. For the virtual reality glasses, there are a variety of virtual reality glasses in the current market, where one of the virtual reality glasses is used for assembling with a display screen of a portable electronic device (such as a mobile phone or a tablet), such that a user is able to immediately watch a visual effect in virtual reality without being confined by location. Furthermore, this kind of virtual reality glasses does not need any electronic circuit or chip. However, in the current market, this kind of virtual reality glasses is large and inconvenient to carry, so it is not in conformity with the demand of most consumers.

Therefore, it is necessary to provide a portable virtual reality glasses which can be assembled with a portable electronic device (such as a smart phone) and is convenient to carry and use.

SUMMARY OF THE INVENTION

In order to solve the above-mentioned technical problems, an objective of the present invention is to provide a portable virtual reality glasses, which can not only be extended for assembling with a portable electronic device to create visual virtual reality environments, but can also be folded for convenience to carry.

In order to achieve the above objects, the present invention provides a portable virtual reality glasses for accommodating an electronic device, which comprises a frame and a spectacle frame assembly. The frame comprises a first cover, a second cover opposite to the first cover, a first side plate body respectively connected with the first cover and the second cover, and a second side plate body opposite to the first side plate body and respectively connected with the first cover and the second cover, wherein the first cover, the second cover, the first side plate body, and the second side plate body are connected with each other to define an accommodation space. By relatively moving the first side plate body and the second side plate body with respect to the first cover and the second cover, the frame is transformed to either an extended state or a folded state, to change a volume of the accommodation space. The spectacle frame assembly is connected with the frame, for moving relative to the accommodation space of the frame, wherein the spectacle frame assembly comprises at least one optical lens for producing stereoscopic visual effects.

In a preferred embodiment of the present invention, the first side plate body is respectively and pivotally connected to the first cover and the second cover, and the second side plate body is respectively and pivotally connected to the first cover and the second cover.

In a preferred embodiment of the present invention, the first side plate body and the second side plate body respectively comprise an upper plate and a lower plate, the upper plate is pivotally connected to the lower plate. When the frame is transformed to either the extended state or the folded state, the upper plate is pivoted with respect to the first cover and the lower plate is pivoted with respect to the second cover.

In a preferred embodiment of the present invention, the portable virtual reality glasses further comprises at least one adhesive sheet for connecting the first cover with the upper plate, connecting the upper plate with the lower plate, and connecting the lower plate with the second cover.

In a preferred embodiment of the present invention, the spectacle frame assembly of the portable virtual reality glasses further comprises a spectacle skeleton, one side of which is pivotally connected to the frame. When the frame is in the extended state, another side of the spectacle skeleton supports the frame, or when the frame is transformed to the folded state, the spectacle skeleton is pivoted toward an inner of the accommodation space.

In a preferred embodiment of the present invention, the spectacle skeleton comprises at least one protrusive spindle, and the frame comprises at least one socket for fastening to the protrusive spindle of the spectacle skeleton, such that the spectacle skeleton is pivotable at the protrusive spindle within the accommodation space.

In a preferred embodiment of the present invention, the spectacle skeleton further comprises at least one protrusive post, and the frame further comprises at least one through hole. When the frame is in the extended state, the protrusive post of the spectacle skeleton is engaged within the through hole of the frame for supporting the frame.

In a preferred embodiment of the present invention, the spectacle frame assembly further comprises at least one eyeglasses fastening assembly for assembling with the spectacle skeleton. At least one groove corresponding to the spectacle skeleton is formed on the eyeglasses fastening assembly, for moving the eyeglasses fastening assembly together with the optical lens along a direction parallel to the electronic device. The spectacle skeleton comprises at least one positioning elastic arm at a portion corresponding to the groove of the eyeglasses fastening assembly, for preventing the eyeglasses fastening assembly from sliding in the spectacle skeleton.

In a preferred embodiment of the present invention, the portable virtual reality glasses further comprises a slidable assembly assembled with the frame. The first cover of the frame further comprises at least one slot for assembling with the slidable assembly. The spectacle frame assembly further comprises at least one eyeglasses fastening assembly, and the eyeglasses fastening assembly is fixed on the slidable assembly.

In a preferred embodiment of the present invention, the eyeglasses fastening assembly comprises a bending section. When the frame is in the folded state, the eyeglasses fastening assembly rests on the first cover of the frame by bending the bending section, or when the frame is transformed to the extended state, the eyeglasses fastening assembly is perpendicular to the first cover of the frame by reversely bending the bending section.

In a preferred embodiment of the present invention, the slidable assembly comprises at least one first direction moving member, at least one second direction moving member, and at least one block. The eyeglasses fastening assembly is fixed on the block, and a first direction moving member and a second direction moving member are disposed between the eyeglasses fastening assembly and the block, for respectively moving the at least one block together with the eyeglasses fastening assembly toward a first direction and a second direction.

In a preferred embodiment of the present invention, a stopping section is formed on at least one of the first cover and the second cover. The stopping section is extended between the first cover and the second cover to commonly define a containing section with the first cover and the second cover. When the frame is in the extended state, the containing section is used for accommodating the electronic device.

In a preferred embodiment of the present invention, the portable virtual reality glasses further comprises a barrier, a pivot end of which pivotally connected with the first cover of the frame. When the frame is in the extended state, a connecting end of the barrier is connected to the second cover, for preventing falling-off of the electronic device. When the frame is transformed from the extended state to the folded state, the barrier is pivoted 270 degrees and rests on the first cover of the frame.

In a preferred embodiment of the present invention, there are magnets respectively disposed on the pivot end of the barrier and a portion where the second cover is connected with the barrier. When in the extended state, the magnets of the barrier and the second cover are attracted with each other.

In a preferred embodiment of the present invention, the portable virtual reality glasses further comprises a division plate disposed in the accommodation space and pivotally connected with the frame, for partitioning a left-eye image and a right-eye image which are displayed by the electronic device. The division plate comprises a protrusive section, and the frame further comprises a locating slot. When the frame is in the extended state, the protrusive section of the division plate is snapped with the locating slot of the frame, and the division plate aligns with a separation line of the left-eye image and the right-eye image which are displayed by the electronic device.

In a preferred embodiment of the present invention, the first side plate body and the second side plate body respectively comprise an open-hole section for assembling with an elastic loop. There is an acute angle formed between the open-hole section and a horizontal plane.

In a preferred embodiment of the present invention, the first cover of the frame comprises a tenon, and the second cover comprises a mortise. When the frame is in the folded state, the tenon of the first cover is snapped with the mortise of the second cover.

In a preferred embodiment of the present invention, the second cover of the frame comprises an opening for operating an interface of the electronic device through the opening.

DETAILED DESCRIPTION OF THE INVENTION

Figure 1:
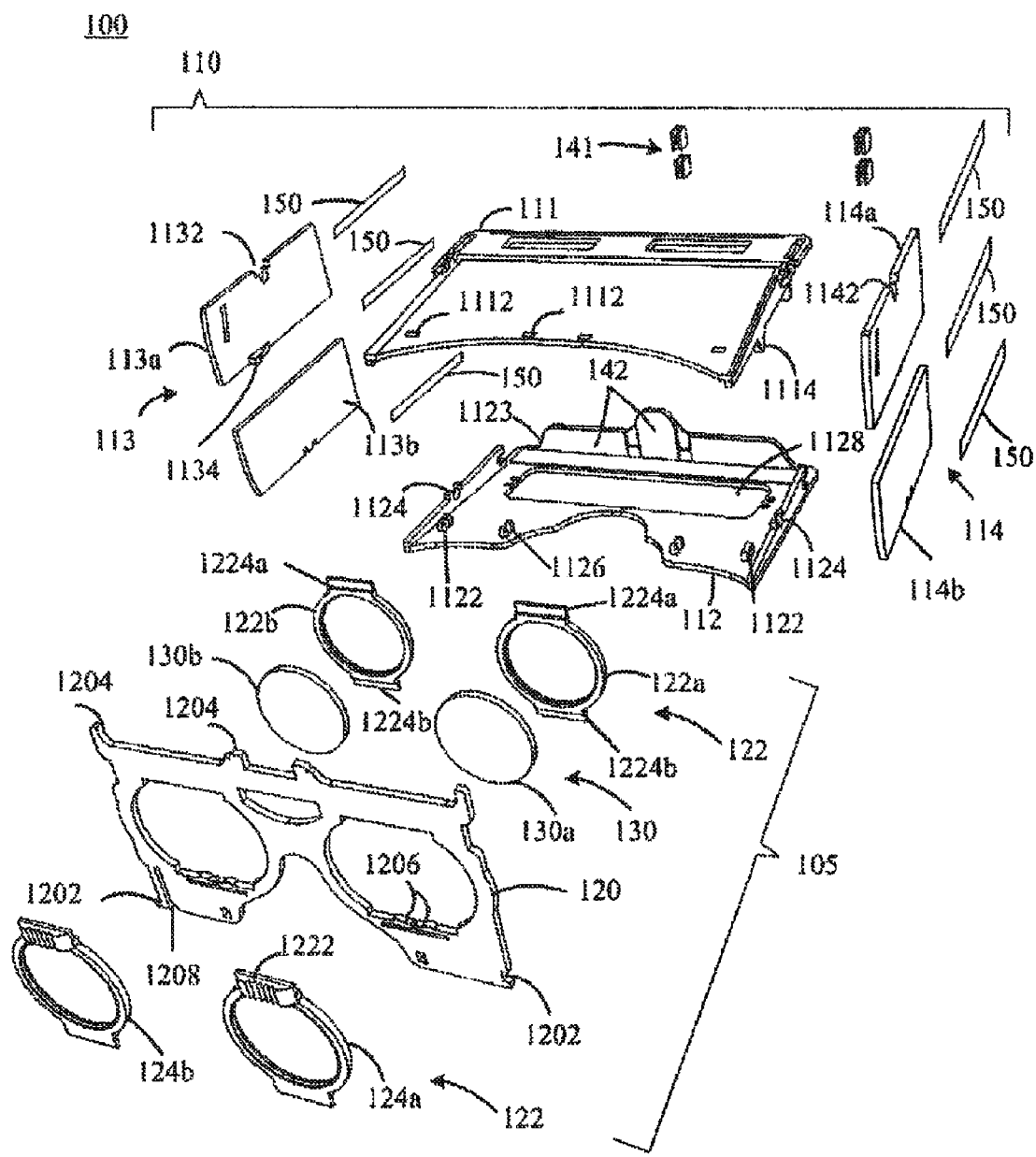
FIG. 1 depicts an exploded diagram of a portable virtual reality glasses according to a first preferable embodiment of the present invention.

The present invention will now be described in detail with reference to a few preferred embodiments thereof as illustrated in the accompanying drawings. Furthermore, directional terms described by the present invention, such as upper, lower, front, back, left, right, inner, outer, side etc., are only directions by referring to the accompanying drawings, and thus the used directional terms are used to describe and understand the present invention, but the present invention is not limited thereto. In addition, the same reference numerals refer to the same parts or like parts throughout the various figures.

Figure 2A:
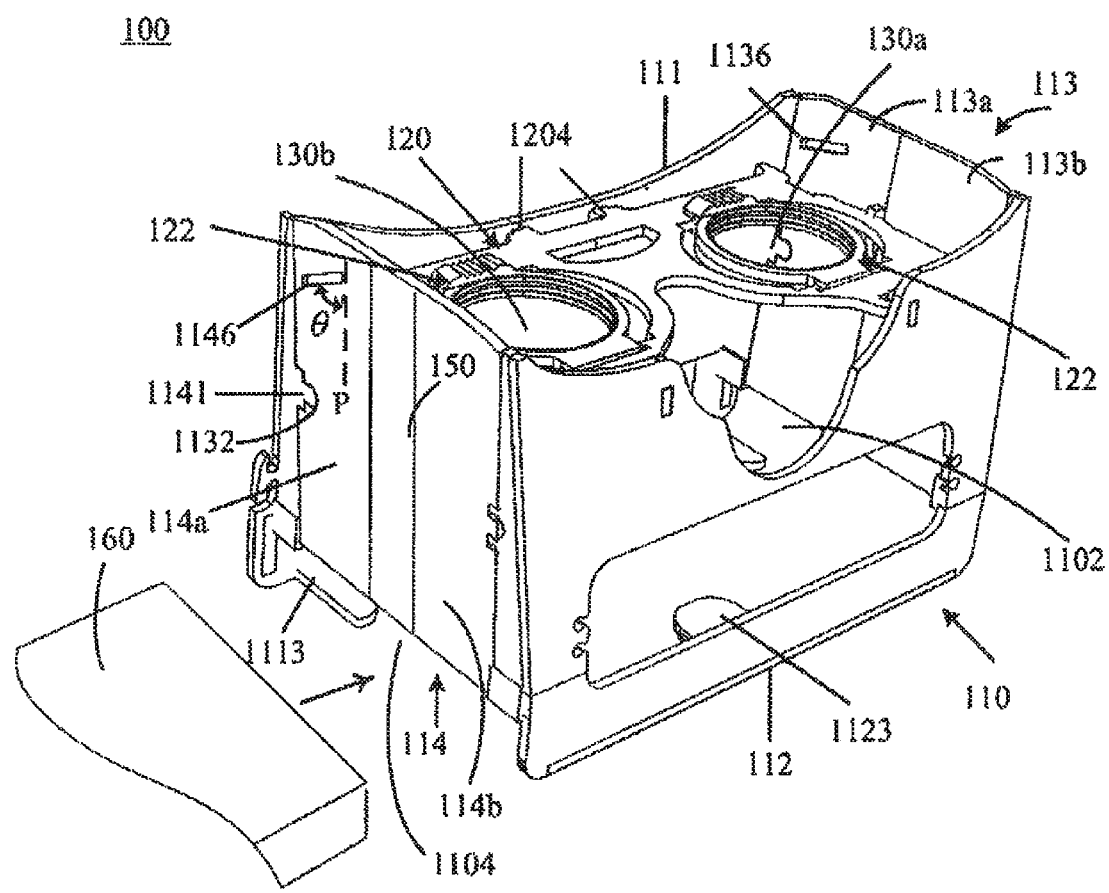
FIG. 2A depicts an assembly diagram of FIG. 1 in an extended state.

Please refer to FIG. 1 and FIG. 2A, FIG. 1 depicts an exploded diagram of a portable virtual reality glasses 100 according to a first preferable embodiment of the present invention. The portable virtual reality glasses 100 comprises a frame 110 and a spectacle frame assembly 105. The frame 110 comprises a first cover 111, a second cover 112, a first side plate body 113, and a second side plate body 114. The second cover 112 corresponds to the first cover 111, and both sides of the first side plate body 113 are respectively connected with a side (e.g. a left side) of the first cover 111 and a side of the second cover 112, and both sides of the second side plate body 114 are respectively connected with a side (e.g. a right side) of the first cover 111 and a side of the second cover 112. Hence, the first cover 111, the second cover 112, the first side plate body 113, and the second side plate body 114 are connected with each other to define an accommodation space 1102 (see FIG. 2A).

As shown in FIG. 1 and FIG. 2A, in this embodiment, each side plate body of the first side plate body 113, and the second side plate body 114 may comprise two separable upper plate 113a (or 114a) and lower plate 113b (or 114b). The two upper plates 113a and 114a are respectively and pivotally connected with two opposite sides of the first cover 111, and the two lower plates 113b and 114b are respectively and pivotally connected with two opposite sides of the second cover 112. The upper plate 113a is parallel to the upper plate 114a and the lower plate 113b is parallel to the lower plate 114b. The upper plate 113a is pivotally connected with the lower plate 113b, and the upper plate 114a is pivotally connected with the lower plate 114b. Thus, by relatively moving the first side plate body 113 and the second side plate body 114 with respect to the first cover 111 and the second cover 112, the frame 110 can be transformed to either an extended state or a folded state.

Figure 3:
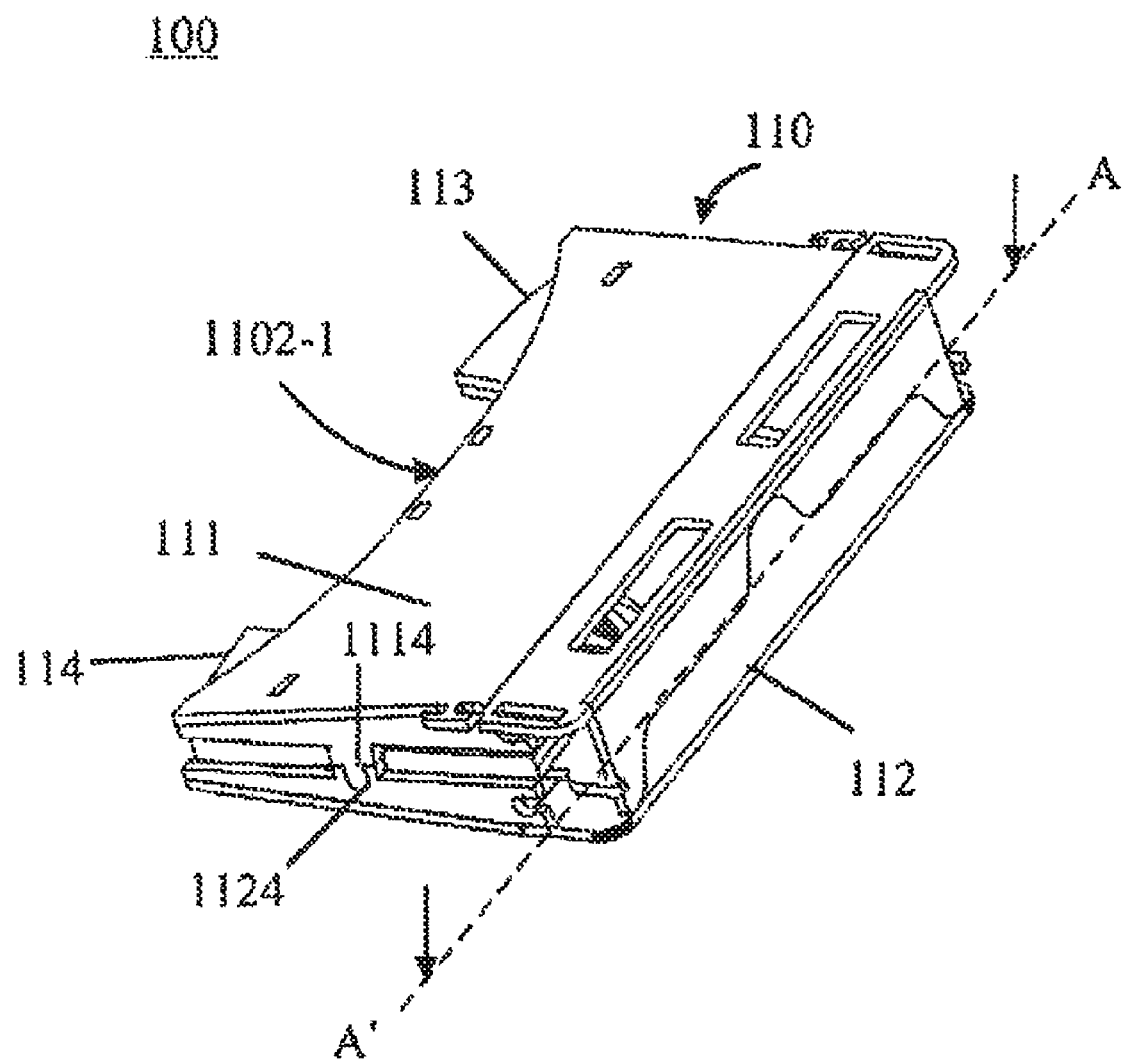
FIG. 3 depicts a stereoscopic diagram of FIG. 1 in a folded state.
Figure 4:
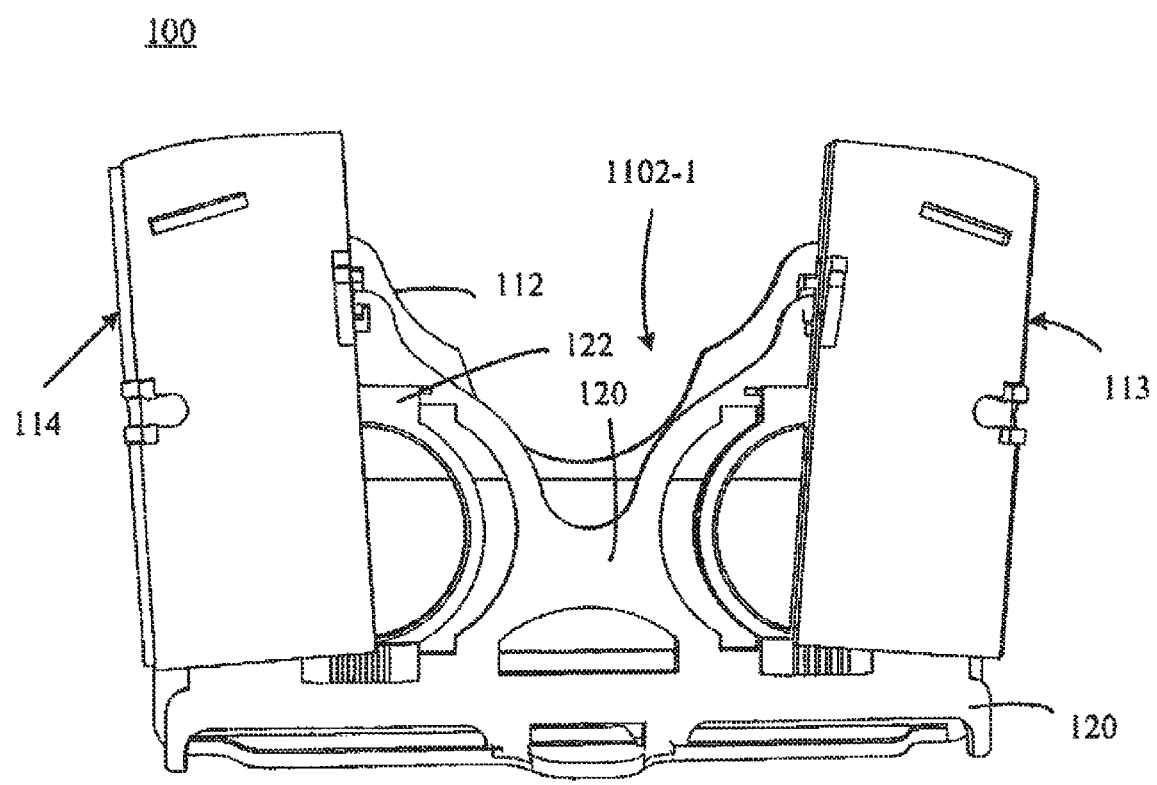
FIG. 4 depicts a lower portion in a cross-sectional view along an A-A' cutting line according to FIG. 3.

When the frame 110 is transformed from the extended state (as shown in FIG. 2A) to the folded state (as shown in FIG. 3), the upper plates 113a and 114a and the lower plates 113b and 114b of the first side plate body 113 and the second side plate body 114 are pivoted in a direction toward an inner of a large accommodation space 1102 surrounded by the frame 110, thereby further defining a small accommodation space 1102-1 (see FIG. 3 and FIG. 4). It should be noted that when the frame 110 is in the folded state, the first side plate body 113 and the second side plate body 114 can be accommodated in the small accommodation space 1102-1 surrounded by the frame 110 (see FIG. 3 and FIG. 4). On the other hand, when the frame 110 is transformed from the folded state (as shown in FIG. 3) to the extended state (as shown in FIG. 2A), the first side plate body 113 and the second side plate body 114 are simultaneously pivoted in a direction toward out of the accommodation space 1102, the upper plates 113a and 114a and the lower plates 113b and 114b are extended and aligned with each other (see FIG. 2A), thereby defining the large accommodation space 1102.

As shown in FIG. 1 and FIG. 2A, in this embodiment, the upper plates 113a and 114a, the lower plates 113b and 114b, the first cover 111, and the second cover 112 are pivotally connected by using adhesive sheets 150, but the present invention is not limited thereto. In the other embodiments, the adhesive sheet 150 can be replaced by any kind of flexible substrate covered with an adhesive layer, which can be used to connect two elements. For example, the material of flexible substrate may be plastic, paper, fabric, etc.

As shown in FIG. 1 and FIG. 3, the first cover 111 of the frame 110 comprises two tenons 1114 on both sides thereof, and the second cover 112 comprises two mortises on both sides thereof for correspondingly engaging with the tenons 1114, so as to make sure that the frame 110 of the portable virtual reality glasses 100 is maintained in the folded state. The first side plate body 113 and the second side plate body 114 further comprise mortises 1132 and 1142 which respectively correspond to the two tenons 1114 of the first cover 111. As shown in FIG. 1 and FIG. 2A, when the frame 110 is in the extended state, the two mortises 1132 and 1142 of the first side plate body 113 and the second side plate body 114 are respectively snapped with the two tenons 1114 of the first cover 111, such that they will not intervene with each other to restrict the extension of the frame 110.

As shown in FIG. 1 and FIG. 2A, in the frame 110, a stopping section 1113 is formed on a front end of the first cover 111, and another stopping section 1123 is formed on a front end of the second cover 112. The stopping sections 1113 and 1123 are perpendicularly extended between the first cover 111 and the second cover 112. The stopping sections 1113 and 1123, the first cover 111, and the second cover 112 commonly define a containing section 1104. When the frame 110 is in the extended state, the containing section 1104 is used for accommodating an electronic device 160. The electronic device 160 may be, but is not limited to, a mobile phone, a tablet, or a digital display device, etc. In the other embodiments, the stopping section may be just formed on one of the first side plate body 113 or the second side plate body 114. Furthermore, an opening 1128 is formed on a surface of the second cover 112 of the frame 110, such that a user can operate on an interface (not shown in Figs.) on a screen of the electronic device 160 through the opening 1128.

As shown in FIG. 1 and FIG. 2A, the spectacle frame assembly 105 is disposed on the accommodation space 1102 of the frame 110 and connected with the frame 110. The spectacle frame assembly 105 comprises a spectacle skeleton 120, a pair of optical lens 130, and an eyeglasses fastening assembly 122 for assembling with the pair of optical lens 130. The spectacle skeleton 120 comprises a pair of outward extended protrusive spindles 1202 on a bottom side thereof, and the second cover 112 comprises a pair of sockets 1122. The pair of protrusive spindles 1202 of the spectacle skeleton 120 respectively horizontally pass through the pair of sockets 1122 of the second cover 112, such that the bottom of the spectacle skeleton 120 can pivot with respect to the second cover 112 of the frame 110. The second cover 112 comprises a pair of auxiliary positioning base 1126 on a connection line of the pair of sockets 1122 for engaging with two small holes (unmarked in Figs.) located on the bottom of the spectacle skeleton 120, so as to make sure that the pair of the protrusive spindles 1202 of the spectacle skeleton 120 are aligned in a straight line, and the formation of the spectacle skeleton 120 will not be changed or distorted by an addition force. Moreover, the spectacle skeleton 120 further comprises a long slot 1208 formed between one of the protrusive spindles 1202 and the spectacle skeleton 120, which serves as a buffer space for the deformation of squeezing the spectacle skeleton 120 when the pair of protrusive spindles 1202 are assembled with the pair of socket 1122. In addition, the spectacle skeleton 120 comprises a plurality of perpendicularly extended protrusive posts 1204 on a top side thereof, and the first cover 111 comprises a plurality of corresponding through holes 1112. The frame 110 further comprises at least one wedge 1134 having a guiding inclined plane on the upper plate 113a of the first side plate body 113 or the upper plate 114a of the second side plate body 114. The wedge 1134 extends toward the accommodation space 1102 for guiding and positing both sides of the spectacle skeleton 120 when the frame 110 is transformed to the extended state.

When the spectacle skeleton 120 is transformed from the folded state (as shown in FIG. 4) to the extended state (as shown in FIG. 2A), the spectacle skeleton 120 which is accommodated in the small accommodation space 1102-1 (see FIG. 4) and rest on or is parallel to the second cover 112 is pivoted toward the first cover 111 about an axis (as shown in FIG. 1 and FIG. 4) which is a connection line between the pair of protrusive spindles 1202 on the bottom of the spectacle skeleton 120 and the pair of sockets 1122 of the second cover 112 until a movement of the both sides of the spectacle skeleton 120 is resisted by the wedge 1134 (as shown in FIG. 1 and FIG. 2A), and the plurality of protrusive posts 1204 on the top side of the spectacle skeleton 120 are engaged within the corresponding through holes 1112 of the first cover 111, thereby supporting the frame 110. That is, the spectacle skeleton 120 is pivoted to an optimum position for watching the screen of the electronic device 160.

As shown in FIG. 1, a pair of closed circular openings are respectively formed on left and right sides of the spectacle skeleton 120. Each of closed circular openings is used for assembling with optical lens 130a or 130b and an eyeglasses fastening assembly 122. Each eyeglasses fastening assembly 122 comprises a first eyeglass clamping ring 122a (or 122b) and a second eyeglass clamping ring 124a (or 124b) for respectively clamping the corresponding optical lens 130a or 130b. After each eyeglasses fastening assembly 122 is assembled with the optical lens 130a or 130b, they are assembled with the corresponding dosed circular opening (as shown in FIG. 2A).

It should be noted that in the portable virtual reality glasses 100 of this embodiment, a distance between the pair of optical lens 130a and 130b can be adjusted according to the eyes distance between of a user. Thus, as shown in FIG. 1 and FIG. 2A, each dosed circular opening matches a diameter size of the optical lens 130a or 130b and each eyeglasses fastening assembly 122, such that after each eyeglasses fastening assembly 122 is assembled with the dosed circular opening of the spectacle skeleton 120, each eyeglasses fastening assembly 122 together with the optical lens 130a or 130b can be moved in a left-right direction (parallel to the electronic device 160) on the spectacle skeleton 120, thereby optimally adjusting the distance between the optical lens 130a and 130b.

Please refer to FIG. 1 and FIG. 2A, in order to achieve that each eyeglasses fastening assembly 122 can be steadily moved on an inner circumference of the dosed circular opening of the spectacle skeleton 120 by a user, rather than sliding on the dosed circular openings in an accident manner, at least one upper groove 1224a and lower groove 1224b are respectively formed on a top and bottom portion of an outer circumference of each eyeglasses fastening assembly 122, where the top and bottom portion correspond to connection portions of the inner circumference of the dosed circular opening of the spectacle skeleton 120. When each eyeglasses fastening assembly 122 together with the optical lens 130a or 130b is assembled to the inner circumference of the dosed circular opening of the spectacle skeleton 120, the upper groove 1224a and the lower groove 1224b serving as sliding grooves are arranged on opposite sides of the inner circumference of the dosed circular opening of the spectacle skeleton 120, such that each eyeglasses fastening assembly 122 can be moved in a left-right direction (parallel to the electronic device 160). The user can push pushable adjustment buttons 1222 to adjust the distance between the pair of eyeglasses fastening assemblies 122 which are respectively clamped the left-eye or right-eye optical lens 130. Moreover, a pair of positioning elastic arms 1206 angled and extending toward to each other are formed on the inner circumference of the dosed circular opening of the spectacle skeleton 120 corresponding to the upper groove 1224a or the lower groove 1224b of each eyeglasses fastening assembly 122 for preventing the eyeglasses fastening assembly 122 sliding on the spectacle skeleton 120 in an accident manner. As shown in FIG. 1, the pair of positioning elastic, arm 1206 are disposed on the spectacle skeleton 120 corresponding to the lower groove 1224b of the eyeglasses fastening assembly 122, but not limited thereto. Each positioning elastic arm 1206 comprises a protrusion on the end thereof for elastically pressing against an inner wall of the lower groove 1224b of the eyeglasses fastening assembly 122.

Please refer to FIG. 1 and FIG. 2A, in order to prevent the electronic device 160 from sliding in the containing section 1104, the portable virtual reality glasses 100 further comprises at least one anti-slipping block 141 and at least one replaceable pad 142. The anti-slipping block 141 and the replaceable pad 142 may be selected from material having a high friction coefficient, e.g. rubber, silicone, sponge, etc. The anti-slipping block 141 is disposed on the corner area where the electronic device 160 contacts with the containing section 1104, and the replaceable pad 142 may be disposed on any portion which contacts with the electronic device 160, such as disposed on the stopping section 1123 of second cover 112 or the stopping section 1113 of the first cover 111 of the frame 110. The replaceable pad 142 cannot only be used to prevent the electronic device 160 from sliding in the containing section 1104, but can also be used to provide a holding force for clamping the electronic device 160. For example, when the replaceable pad 142 is disposed on the stopping section 1123 of the second cover 112, the electronic device 160 contacts with the replaceable pad 142, and the replaceable pad 142 will provide an opposite force to the electronic device 160, thereby enhancing an effect of clamping the electronic device 160. The thickness of the replaceable pad 142 is selectable, and the user may choose the thickness of the replaceable pad 142 based on the thickness of the electronic device.

Figure 2B:
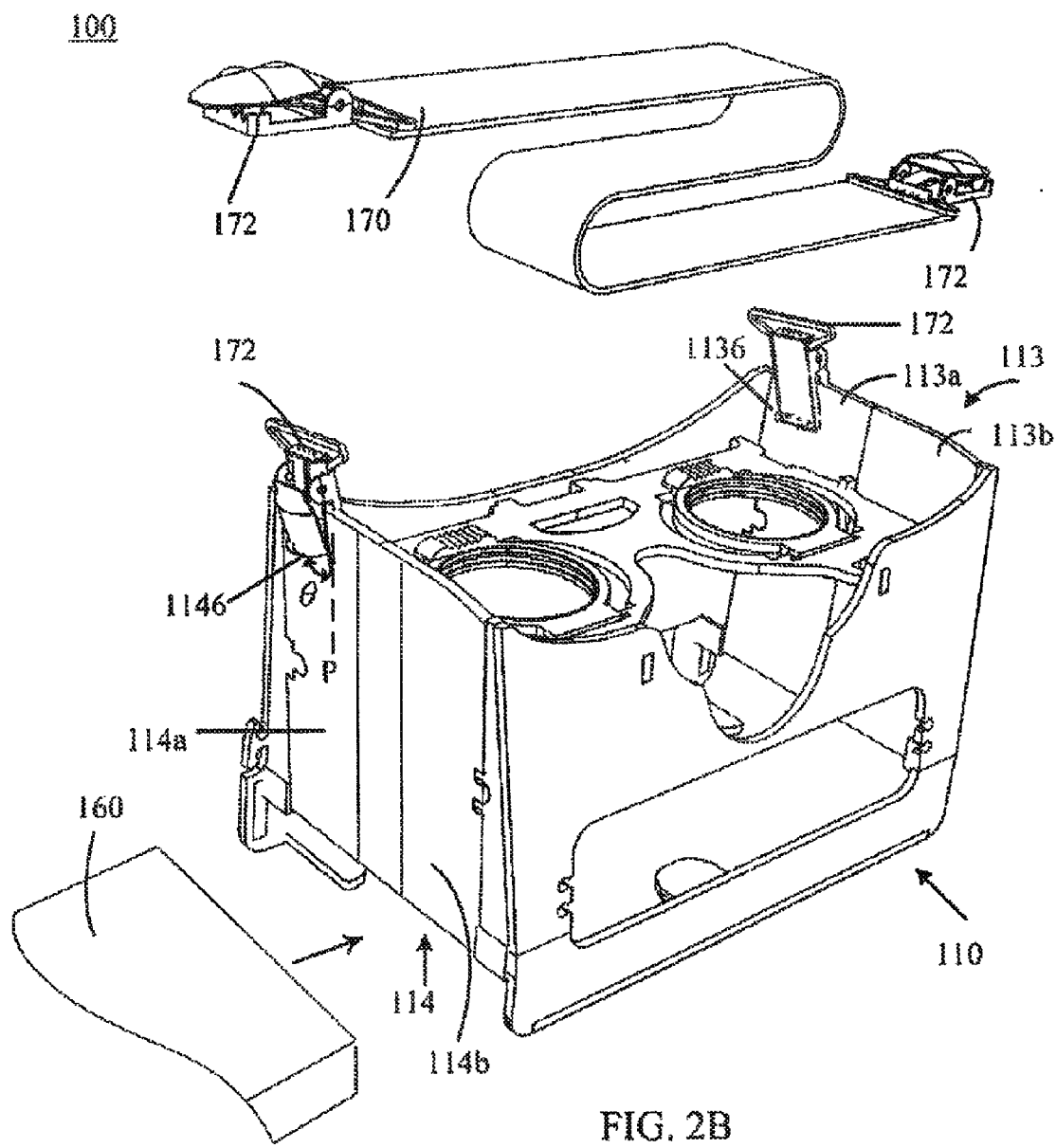
FIG. 2B depicts an assembly diagram of FIG. 2A assembled with an elastic loop.

Please refer to FIG. 2B, the portable virtual reality glasses 100 of the present invention may be assembled with an elastic loop 170. According to this embodiment, the frame 110 comprises open-hole sections 1136 and 1146 respectively on the upper plate 113a of the first side plate body 113 and the upper plate 114a of the second side plate body 114, such that clamps 172 of the elastic loop 170 engage on the frame 110. The user can wear the portable virtual reality glasses 100 on the head by using the elastic loop 170.

In general, the electronic device 160 has a certain weight, so the portable virtual reality glasses 100 together with electronic device 160 will apply a force toward to the ground when the user wear the portable virtual reality glasses 100 in the head. Thus, the user may feel uncomfortable due to the fact that non-uniform force is applied on the face. In order to prevent the above-mentioned problem, there is an acute angle θ formed between the open-hole sections 1136 and 1146 and a horizontal plane P. When the user wears the portable virtual reality glasses 100 on the head, the elastic loop 170 will provide a pull-up force on the frame 110. Moreover, the elastic loop 170 has a certain thickness. By angular arrangement of the elastic loop 170 in the assembly, the situation that the elastic loop 170 presses against the ear can be prevented when the user wears the portable virtual reality glasses 100 on the head.

Please refer to FIG. 3 and FIG. 4, which depict the portable virtual reality glasses 100 in the folded state. As shown in FIG. 3, when the frame 110 is in the folded state, the first side plate body 113 and the second side plate body 114 are accommodated in the small accommodation space 1102-1 surrounded by the frame 110, and the tenon 1114 of the first cover 111 is snapped with the mortise 1124 of the second cover 112, such that the portable virtual reality glasses 110 is maintained in the folded state. As shown in FIG. 4, the spectacle skeleton 120 of the spectacle frame assembly of the portable virtual reality glasses 100 is pivoted to rest on the second cover 112. Therefore, by using the simple fold method as mentioned above, the occupied space of the entire portable virtual reality glasses can be substantially reduced, so that it is convenient to carry.

According to the portable virtual reality glasses of the first preferable embodiment of the present invention, the distance between the right-eye and left-eye optical lens can be adjusted in conformity with the eyes distance of the user. However, for some people, the difference in degree of myopia between the two eyes is greater, so the distance of distinct vision for two eyes is different. Thus, the other object of the present invention is to provide a portable virtual reality glasses, where the distance between each optical lens and the electronic device can be adjusted.

Figure 5:
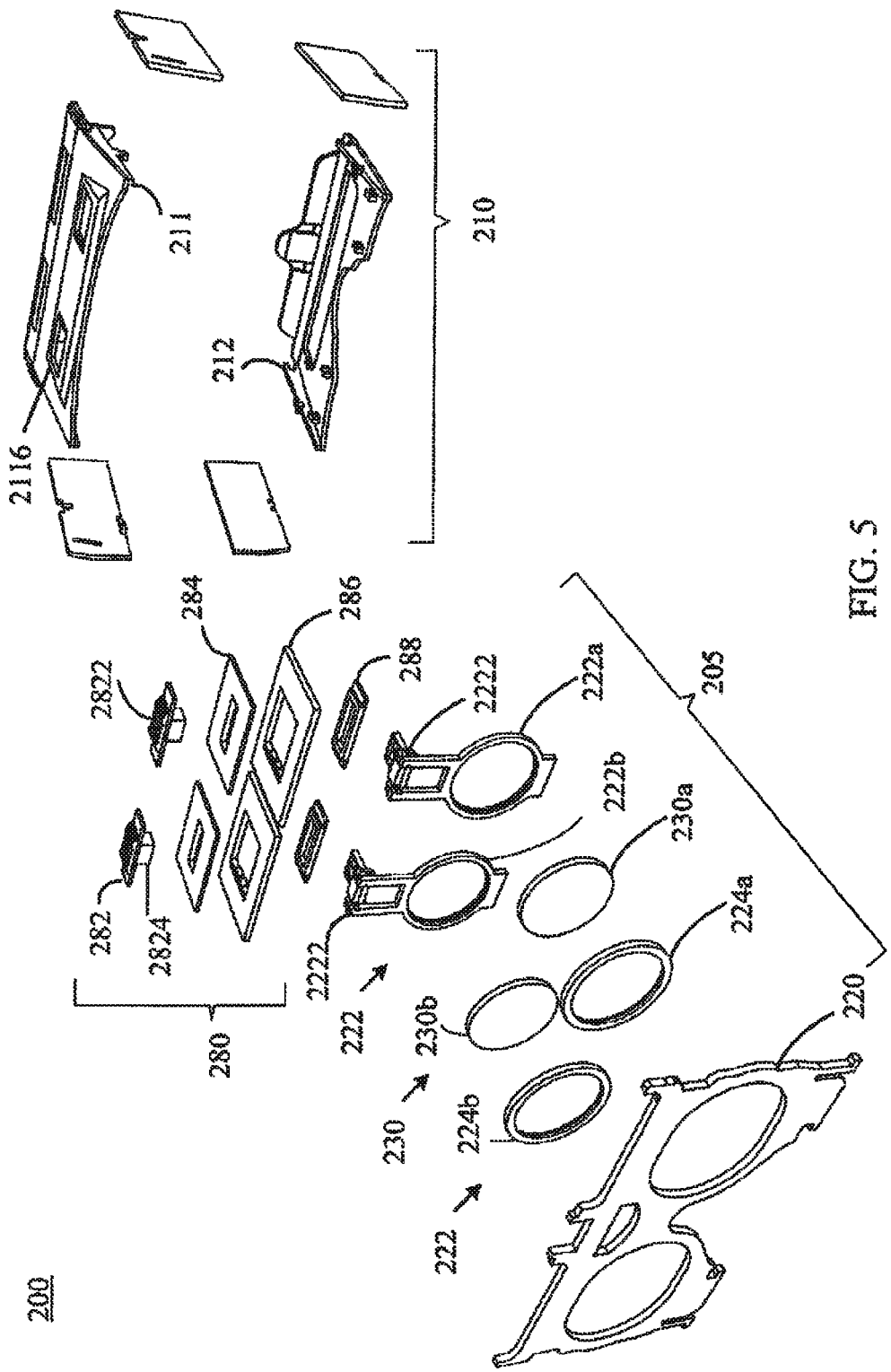
FIG. 5 depicts an exploded diagram of a portable virtual reality glasses according to a second preferable embodiment of the present invention.

Please refer to FIG. 5, which depicts an exploded diagram of a portable virtual reality glasses according to a second preferable embodiment of the present invention. The portable virtual reality glasses 200 comprises a frame 210 and a spectacle frame assembly 205. The main structure and connection method of the frame 210 of the second embodiment is similar to the first embodiment, and repeated explanation is omitted here. The spectacle frame assembly 205 of the portable virtual reality glasses 200 comprises a spectacle skeleton 220 and an eyeglasses fastening assembly 222. In this embodiment, the bottom side the spectacle skeleton 220 of the spectacle frame assembly 205 is pivotally connected with the second cover 212 of the frame 210. When the frame 210 is in the extended state, the spectacle skeleton 220 is just used for supporting the frame 210, where the supporting or assembling method of the spectacle skeleton 220 and the frame 210 is similar to the first embodiment.

Please refer to FIG. 5, the spectacle frame assembly 205 of the second embodiment is similar to the spectacle frame assembly 105 of the first embodiment, and it also comprises a pair of eyeglasses fastening assemblies 222 for clamping a pair of optical lens 230, and each eyeglasses fastening assembly 222 comprises a first eyeglass clamping ring 222A (or 222B) and a second eyeglass clamping ring 224*a* (or 224*b*). The first eyeglass clamping ring 222*a* and the second eyeglass clamping ring 224*a* are used for clamping the corresponding left-eye optical lens 230*a*, and first eyeglass clamping ring 222*b* and the second eyeglass clamping ring 224*b* are used for clamping the corresponding right-eye optical lens 230*b*, and they are respectively assembled to a pair of dosed circular openings of the spectacle skeleton 220.

However, the differences between the first and second embodiment are that: the portable virtual reality glasses 200 of the second embodiment further comprises a pair of slidable assemblies 280, the first eyeglass clamping ring 222*a* and 222*b* of the pair of eyeglasses fastening assemblies 222 respectively comprises a bending section 2222, and a pair of slots 2116 are formed on a surface of the first cover 211 of the frame 210. The pair of slidable assemblies 280 comprise a pair of first direction moving members 284, a pair of second direction moving members 286, a pair of fastening pads 288, and a pair of blocks 282. Each first direction moving member 284, each second direction moving member 286, and each fastening pad 288 respectively comprise an enclosed opening. In assembly, the opening of the first direction moving member 284 is firstly assembled with an extending section 2824 of the block 282, and then the extending section 2824 passes through the corresponding slot 2116 of the first cover 211, such that the first direction moving member 284 is disposed between the black 282 and the at least one slot 2116. The block 282 and the first direction moving member 284 are disposed on outside of the frame 210. Moreover, the extending section 2824 of the block 282 extends inside of the accommodation space surrounded by the frame 210. In the accommodation space, the opening of the second direction moving member 286 and the opening of the fastening pad 288 are sequentially assembled to the extending section 2824. Finally, the opening of the bending section 2222 of the first eyeglass clamping ring 222*s* (or 222*b*) are assembled and fixed on the end of the extending section 2824. Therefore, the second direction moving member 286 and the fastening pad 288 are disposed between the bending section 2222 and the slot 2116. The second direction moving member 286, the fastening pad 288, and the first eyeglass clamping ring 222*a*, and 222*b* are disposed on the accommodation space surrounded by the frame 210.

By the arrangement mentioned above, each slidable assembly 280 is assembled with the corresponding slot 2116 of the frame 210, and the eyeglasses fastening assembly 222 can be moved and adjusted on the accommodation space surrounded by the frame 210 corresponding to the at least one slot 2116 along two directions, such that the distance between the left-eye and right-eye optical lens 230 can be adjusted (i.e. adjusting in conformity with the distance between two eyes), and the distance between the optical lens 230 and the electronic device can be adjusted (i.e. adjusting in conformity with visual focus). In addition, after the slidable assembly 280 is assembled with the corresponding slot 2116, a portion of the block 282 is exposed outside of the at least one slot 2116 to serve as a pushable button section for controlling forward or backward movement.

Please refer to FIG. 5, according to this embodiment, the first direction moving member 284 is disposed between the block 282 and the second direction moving member 286. Thus, the size of the enclosed opening of the first direction moving member 284 is smaller than the size of the enclosed opening of the second direction moving member 286. To be specific, the user moves the block 282 by using the first direction moving member 284, so as to drive the eyeglasses fastening assembly 222 to move toward a first direction parallel to the electronic device. The user moves the block 282 by using the second direction moving member 286, so as to drive the eyeglasses fastening assembly 222 moves toward a second direction perpendicular to the electronic device. Thus, the external contour of the enclosed opening of the first direction moving member 284 is an elongated rectangle, and the long sides of the enclosed opening are parallel to the electronic device. In addition, the external contour of the enclosed opening of the second direction moving member 286 is a rectangle, and the long and width of the rectangular opening of the second direction moving member 286 are greater than the long and width of the elongated rectangular opening of the first direction moving member 284.

Figure 6:
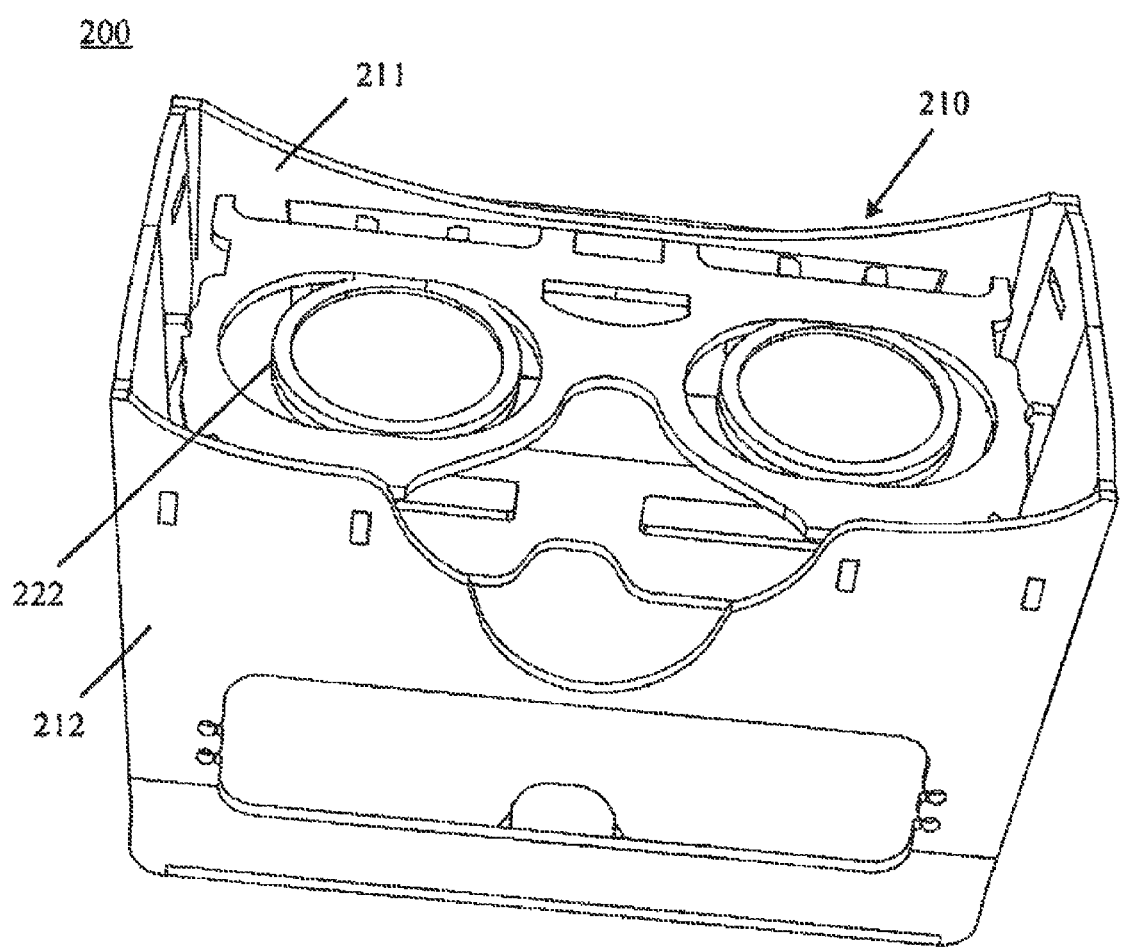
FIG. 6 depicts an assembly diagram of FIG. 5 in an extended state.
Figure 7:
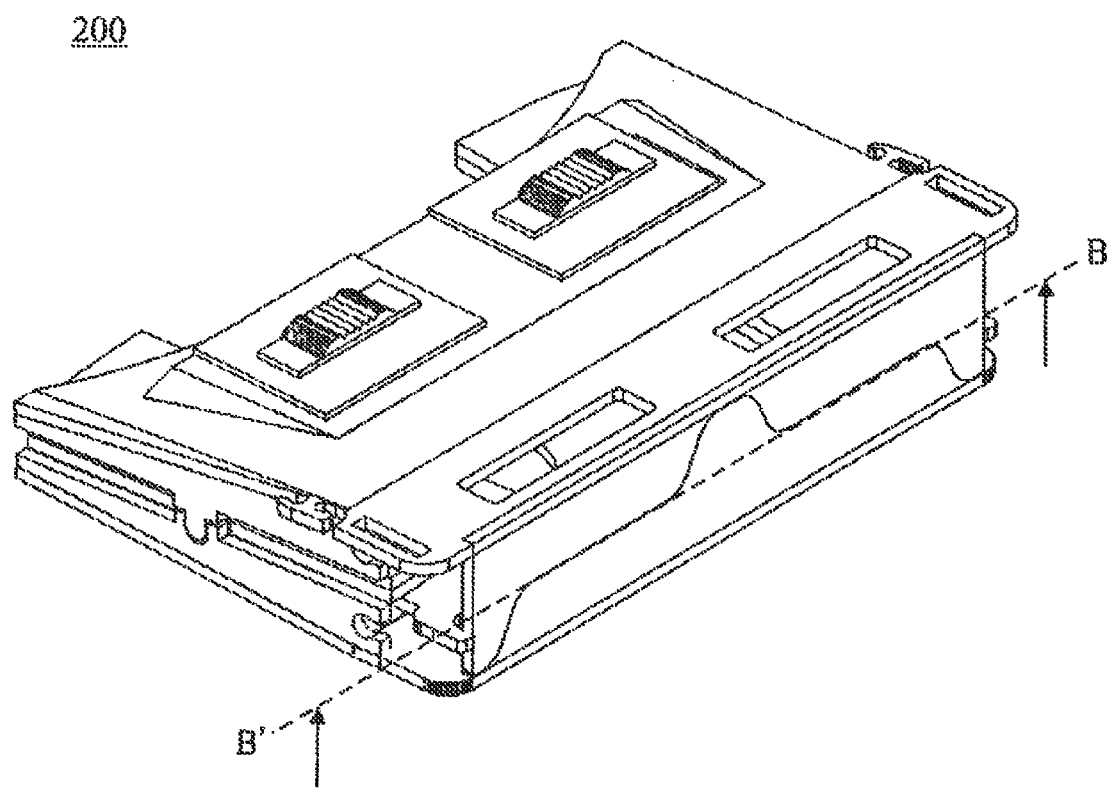
FIG. 7 depicts a stereoscopic diagram of FIG. 5 in a folded state.
Figure 8:
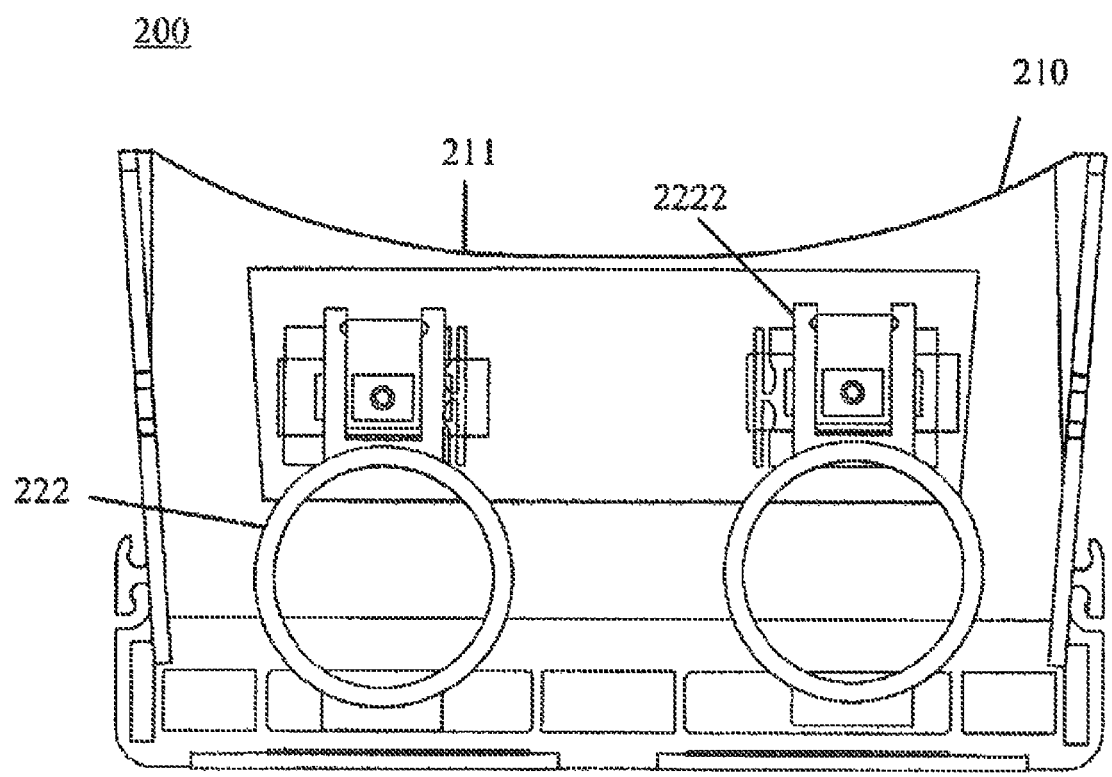
FIG. 8 depicts an upper portion in a cross-sectional view along a B-B' cutting line according to FIG. 7.

On the other hand, the bending section 2222 of the eyeglasses fastening assembly 222 is used for changing the formation of the eyeglasses fastening assembly 222 based on the portable virtual reality glasses 200 either in the folded state or in the extended state. Please refer to FIG. 6 to FIG. 8, which depict diagrams of portable virtual reality glasses 200 of the present invention in the extended state or in the extended state. As shown in FIG. 6, when the portable virtual reality glasses 200 is in the extended state, the eyeglasses fastening assembly 222 is perpendicular to the first cover 211 and the second cover 212 of the frame 210 by bending the bending section (not shown in FIG. 6). As shown in FIG. 7 and FIG. 8, when the portable virtual reality glasses 200 is in the folded state, the eyeglasses fastening assembly 222 rests on the first cover 211 of the frame 210 by reversely bending the bending section 2222.

According to the above mentioned embodiment, the portable virtual reality glasses can be worn on the user's head. When the user uses the portable virtual reality glasses of the present invention to enter a virtual reality world, the user may move his/her head up or down. Thus, it is necessary to provide an element to fasten the electronic device, thereby preventing falling-off of the electronic device when the user moves down his/her head.

Figure 9:
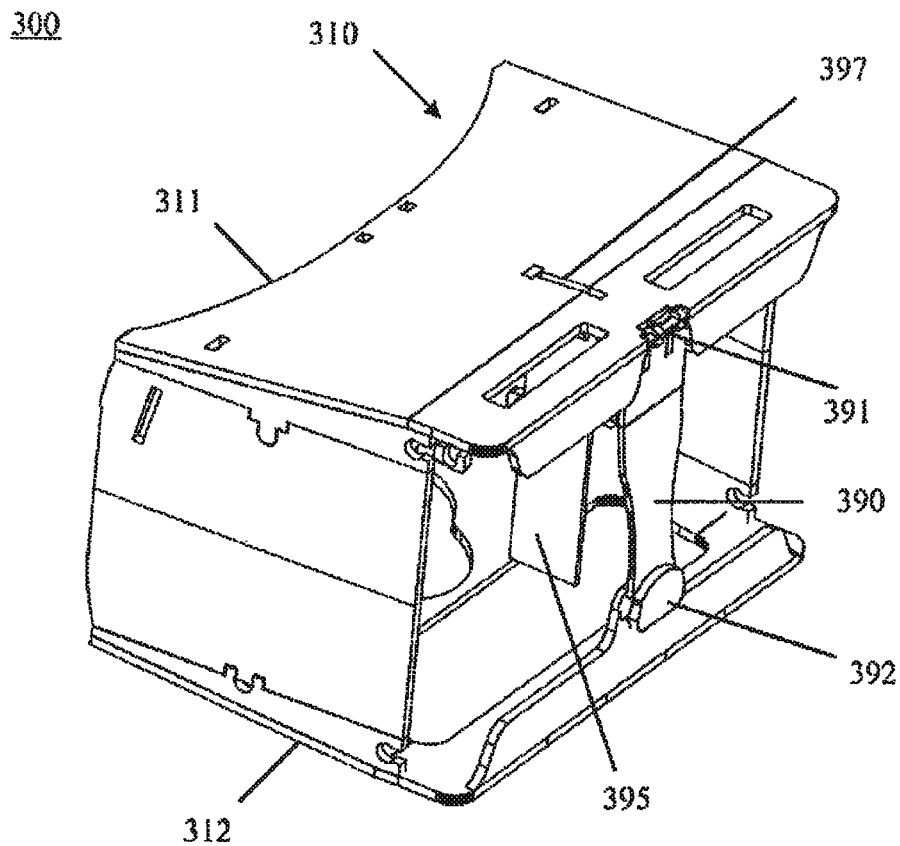
FIG. 9 depicts an assembly diagram of a portable virtual reality glasses according to a third preferable embodiment of the present invention, in which the portable virtual reality glasses is in an extended state.
Figure 10:
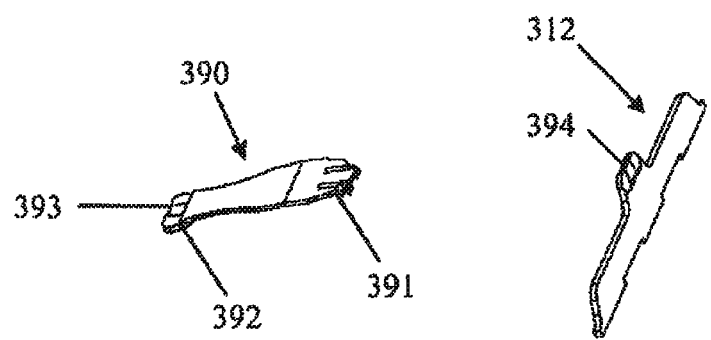
FIG. 10 depicts a partial stereoscopic diagram of a baffler and a second cover according to FIG. 9.

Please refer to FIG. 9 and FIG. 10, the portable virtual reality glasses 300 comprises a barrier 390. The barrier 390 has a pivot end 391 and a connecting end 392 opposite to the pivot end 391. A magnet 393 is disposed on the connecting end 392 of the barrier 390, and a magnet 394 is disposed on the second cover 312 of the frame 310. The pivot end 391 of the barrier 390 is pivotally connected with first cover 311 of the frame 310. When the frame 310 is in the extended state, the barrier 390 is pivoted about the pivot end 391 until the magnet 393 of the connecting end 392 is attracted with the magnet 394 of the second cover 312 for preventing falling-off of the electronic device and fastening the barrier 390 with the second cover 812. In the other embodiment, the magnet may be selected from any magnetic element.

In this embodiment, when in the extended state, the barrier 390 may apply a force on the electronic device for fastening the electronic device. To be specific, the force which the barrier 390 applied can be transmitted to the electronic device by the replaceable pad (referring to FIG. 1) which is directly connected with the electronic device. Furthermore, the pivot end 391 serves as a fulcrum of the barrier 390 for pivotally connecting with the first cover 312. The magnet 393 and 394 impart torques in a direction to the electronic device, thereby transmitting the force to the replaceable pad for fastening the electronic device.

When the portable virtual reality glasses 300 is transformed from the extended state (see FIG. 9) to the folded state (see FIG. 11), the pivot end 391 of the baiter 390 serves as a pivot axis. The connecting end 392 is pivoted about 270 degrees away from the second cover 312, such that the barrier 390 rests on the first cover 311 of the frame 310.

The portable virtual reality glasses of the present invention is used for watching three-dimensional images. For creating stereoscopic visual effects, each image which is displayed by the electronic device will be divided into a left-eye image and a right-eye image. Hence, in order to prevent interference between the left eye and the right eye, it is necessary to provide an element to solve the above mentioned problem.

Figure 11:
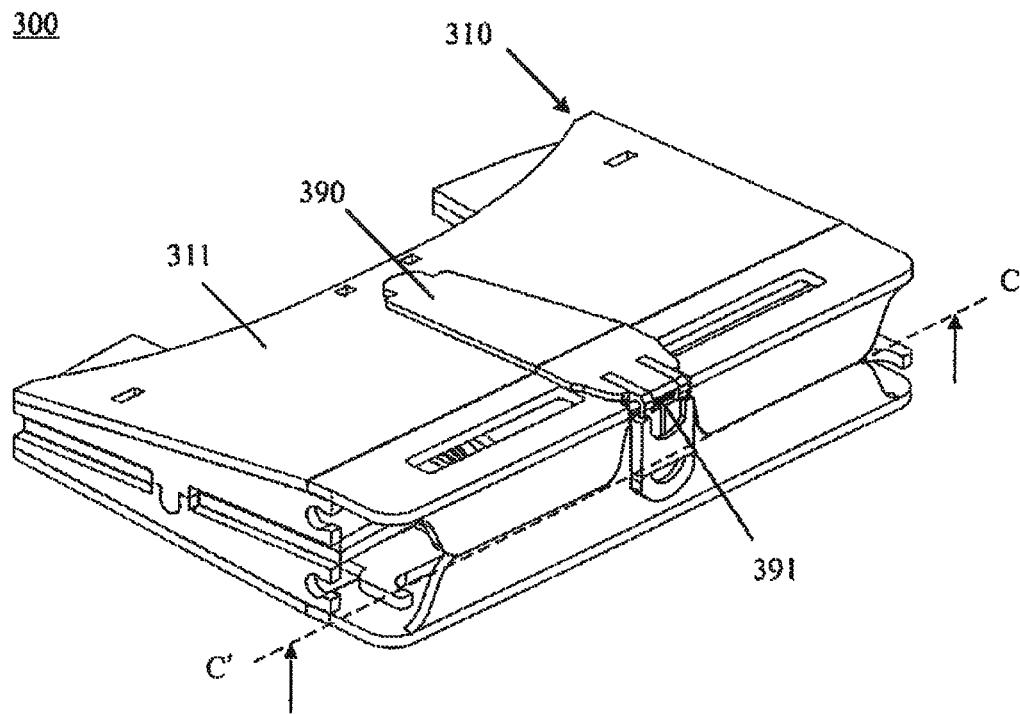
FIG. 11 depicts a stereoscopic diagram of FIG. 9 in a folded state.
Figure 12:
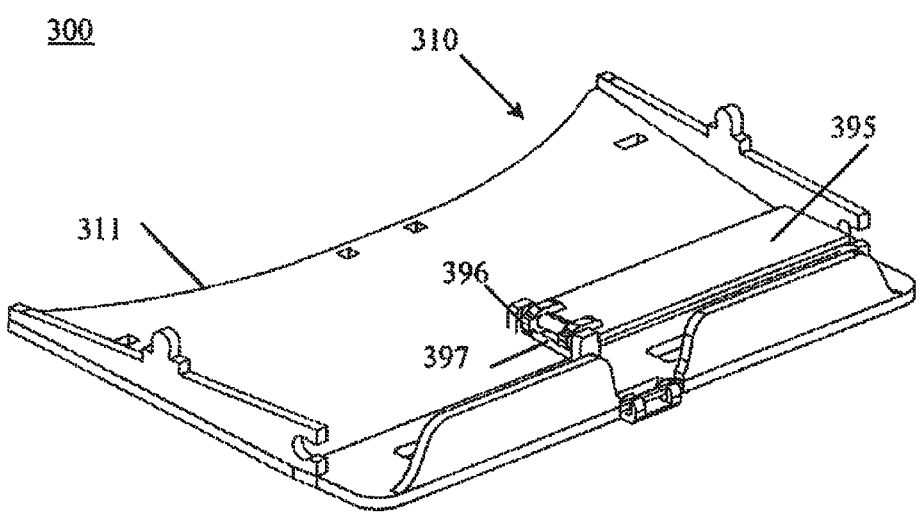
FIG. 12 depicts an upper portion in a cross-sectional view along a C-C' cutting line according to FIG. 11.

Please refer to FIG. 9 and FIG. 11, the portable virtual reality glasses 300 of the present invention further comprises a division plate 395 which is disposed in the frame 310. An end of the division plate 395 is pivotally connected with the first cover 311 of the frame 310. The division plate 395 comprises a protrusive section 396 on the portion where is pivotally connected with the first cover 311. The first cover 311 further comprises a locating slot 397. When the frame 310 is in the extended state, the division plate 395 is pivoted such that it is generally perpendicular first cover 311, and the protrusive section 396 is snapped with the locating slot 397 of the frame 310. Thus, the division plate 390 aligns with a separation line of the left-eye image and the right-eye image which are displayed by the electronic device, so as to separate the left-eye image and the right-eye image. In the folded state, the protrusive section of the division plate is disassembled from the locating slot, and the division plate is pivoted until it rests on the first cover 311.

The above descriptions are merely preferable embodiments of the present invention, but are not intended to limit the scope of the present invention. Any modification or replacement made by those skilled in the art without departing from the spirit and principle of the present invention should fall within the protection scope of the present invention. Therefore, the protection scope of the present invention is subject to the appended claims.

What is claimed is:

1. A portable virtual reality glasses for accommodating an electronic device, comprising:
   a frame, comprising:
   a first cover;
   a second cover opposite to the first cover;
   a first side plate body respectively connected with the first cover and the second cover; and
   a second side plate body opposite to the first side plate body, and respectively connected with the first cover and the second cover, wherein the first cover, the second cover, the first side plate body, and the second side plate body are connected with each other to define an accommodation space, and by relatively moving the first side plate body and the second side plate body with respect to the first cover and the second cover, the frame is transformed into either an extended state or a folded state, to change a volume of the accommodation space; and
   a spectacle frame assembly connected with the frame, for moving relative to the accommodation space of the frame, wherein the spectacle frame assembly comprises at least one optical lens for producing stereoscopic visual effects;
   wherein the first side plate body and the second side plate body respectively comprise an upper plate and a lower plate, the upper plate is pivotally connected to the lower plate; when the frame is transformed to either the extended state or the folded state, the upper plate is pivoted with respect to the first cover and the lower plate is pivoted with respect to the second cover.

2. The portable virtual reality glasses as claimed in claim 1, wherein the first side plate body is respectively and pivotally connected to the first cover and the second cover, and the second side plate body is respectively and pivotally connected to the first cover and the second cover.

3. The portable virtual reality glasses as claimed in claim 1, wherein when the frame is in the folded state, the upper plate and the lower plate are accommodated in the accommodation space.

4. The portable virtual reality glasses as claimed in claim 1, further comprising at least one adhesive sheet for connecting the first cover with the upper plate, connecting the upper plate with the lower plate, and connecting the lower plate with the second cover.

5. The portable virtual reality glasses as claimed in claim 1, wherein the spectacle frame assembly comprises a spectacle skeleton, one side of which is pivotally connected to the frame; when the frame is in the extended state, another side of the spectacle skeleton supports the frame; and when the frame is in the folded state, the spectacle skeleton is pivoted toward an inner of the accommodation space.

6. The portable virtual reality glasses as claimed in claim 5, wherein the spectacle skeleton comprises at least one protrusive spindle, and the frame comprises at least one socket for fastening to the protrusive spindle of the spectacle skeleton, such that the spectacle skeleton is pivotable at the protrusive spindle within the accommodation space.

7. The portable virtual reality glasses as claimed in claim 5, wherein the spectacle skeleton further comprises at least one protrusive post, and the frame further comprises at least one through hole; when the frame is in the extended state, the protrusive post of the spectacle skeleton is engaged within the through hole of the frame for supporting the frame.

8. The portable virtual reality glasses as claimed in claim 5, wherein the spectacle frame assembly further comprises at least one eyeglasses fastening assembly for clamping the optical lens and assembling with the spectacle skeleton.

9. The portable virtual reality glasses as claimed in claim 8, wherein at least one groove corresponding to the spectacle skeleton is formed on the eyeglasses fastening assembly, for moving the eyeglasses fastening assembly together with the optical lens along a direction parallel to the electronic device.

10. The portable virtual reality glasses as claimed in claim 9, wherein the spectacle skeleton comprises at least one positioning elastic arm at a portion corresponding to the groove of the eyeglasses fastening assembly, for preventing the eyeglasses fastening assembly from sliding in the spectacle skeleton.

11. The portable virtual reality glasses as claimed in claim 1, further comprising a slidable assembly assembled with the frame, wherein the spectacle frame assembly further comprises at least one eyeglasses fastening assembly for clamping the optical lens, and the eyeglasses fastening assembly is fixed on the slidable assembly.

12. The portable virtual reality glasses as claimed in claim 11, wherein the eyeglasses fastening assembly comprises a bending section, and when the frame is in the folded state, the eyeglasses fastening assembly rests on the first cover of the frame by bending the bending section, or when the frame is transformed to the extended state, the eyeglasses fastening assembly is perpendicular to the first cover of the frame by reversely bending the bending section.

13. The portable virtual reality glasses as claimed in claim 11, wherein the slidable assembly comprises at least one first direction moving member, at least one second direction moving member, and at least one block, the eyeglasses fastening assembly is fixed on the block, and the first direction moving member and the second direction moving member are disposed between the eyeglasses fastening assembly and the block, for respectively moving the at least one block together with the eyeglasses fastening assembly toward a first direction and a second direction.

14. The portable virtual reality glasses as claimed in claim 13, wherein the first direction moving member is used for moving the eyeglasses fastening assembly toward a direction parallel to the electronic device, and the second direction moving member is used for moving the eyeglasses fastening assembly toward a direction perpendicular to the electronic device.

15. The portable virtual reality glasses as claimed in claim 13, wherein the first cover of the frame further comprises at least one slot for assembling with the slidable assembly, and a portion of the at least one block is exposed outside the at least one slot to serve as a pushable button section.

16. The portable virtual reality glasses as claimed in claim 1, wherein a stopping section is formed on at least one of the first cover and the second cover, the stopping section is extended between the first cover and the second cover to commonly define a containing section with the first cover and the second cover, and when the frame is in the extended state, the containing section is used for accommodating the electronic device.

17. The portable virtual reality glasses as claimed in claim 1, further comprising a barrier, a pivot end of which pivotally connected with the first cover of the frame, wherein when the frame is in the extended state, a connecting end of the barrier is connected to the second cover, for preventing falling-off of the electronic device.

18. The portable virtual reality glasses as claimed in claim 17, wherein when the frame is transformed from the extended state to the folded state, the barrier is pivoted to rest on the first cover of the frame.

19. The portable virtual reality glasses as claimed in claim 17, wherein there are magnets respectively disposed on the pivot end of the barrier and a portion where the second cover is connected with the barrier, and when in the extended state, the magnets of the barrier and the second cover are attracted with each other.

20. The portable virtual reality glasses as claimed in claim 1, further comprising a division plate disposed in the accommodation space and pivotally connected with the frame, for partitioning a left-eye image and a right-eye image which are displayed by the electronic device.

21. The portable virtual reality glasses as claimed in claim 20, wherein the division plate comprises a protrusive section, and the frame further comprises a locating slot, when the frame is in the extended state, the protrusive section of the division plate is snapped with the locating slot of the frame, and the division plate aligns with a separation line of the left-eye image and the right-eye image which are displayed by the electronic device.

22. The portable virtual reality glasses as claimed in claim 1, wherein the first side plate body and the second side plate body respectively comprise an open-hole section for assembling with an elastic loop.

23. The portable virtual reality glasses as claimed in claim 22, wherein there is an acute angle formed between the open-hole section and a horizontal plane.

24. The portable virtual reality glasses as claimed in claim 22, wherein the first cover of the frame comprises a tenon, and the second cover comprises a mortise, and when the frame is in the folded state, the tenon of the first cover is snapped with the mortise of the second cover.

25. The portable virtual reality glasses as claimed in claim 1, wherein the second cover of the frame comprises an opening for operating an interface of the electronic device through the opening.

* * * * *